(12) United States Patent
Nowack et al.

(10) Patent No.: US 8,590,963 B2
(45) Date of Patent: Nov. 26, 2013

(54) WIND DEFLECTOR ARRANGEMENT

(75) Inventors: Tobias Nowack, München (DE); Alexander Kirsch, Hohenschäftlarn (DE); Tobias Mech, Andechs-Machtlfing (DE); Norbert Elbs, München (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 13/640,018

(22) PCT Filed: Apr. 12, 2012

(86) PCT No.: PCT/EP2012/056676
§ 371 (c)(1),
(2), (4) Date: Jan. 24, 2013

(87) PCT Pub. No.: WO2012/167976
PCT Pub. Date: Dec. 13, 2012

(65) Prior Publication Data
US 2013/0187414 A1    Jul. 25, 2013

(51) Int. Cl.
*B60J 7/22* (2006.01)

(52) U.S. Cl.
USPC .......................................... 296/217

(58) Field of Classification Search
USPC .......................................... 296/217
See application file for complete search history.

(56) References Cited

U.S. PATENT DOCUMENTS

| 5,178,436 A * | 1/1993 | Eberius et al. ............ 296/217 |
| 6,644,729 B2 * | 11/2003 | Sakai et al. ............ 296/217 |
| 7,878,582 B2 | 2/2011 | Fidan et al. |
| 8,246,111 B2 * | 8/2012 | Kohout et al. ............ 296/217 |
| 8,292,360 B2 * | 10/2012 | Uehara ............ 296/217 |
| 8,353,557 B2 * | 1/2013 | Rooijakkers ............ 296/217 |
| 8,459,729 B1 * | 6/2013 | Nania et al. ............ 296/217 |
| 2008/0067839 A1 * | 3/2008 | Staltmayer ............ 296/217 |

FOREIGN PATENT DOCUMENTS

| DE | 10255565 B3 | 5/2004 |
| DE | 202006002018 U1 | 8/2006 |
| JP | 2004-168241 A | 6/2007 |
| JP | 2008-247093 A | 10/2008 |

* cited by examiner

*Primary Examiner* — Dennis Pedder
(74) *Attorney, Agent, or Firm* — Fitch, Even, Tabin & Flannery, LLP

(57) ABSTRACT

A wind deflector arrangement for a roof opening, which can be closed and opened up by way of a cover, in a roof panel of a vehicle. The wind deflector can have a frame which is designed to at least partially surround the roof opening, a wind deflector hoop which is coupled to the frame such that the wind deflector hoop is rotatable relative to the frame and the roof panel about a first axis of rotation, a support element which is coupled to the wind deflector hoop and to the frame such that the support element can rotate about a second axis of rotation during a first segment of the movement of the wind deflector hoop relative to the frame and can rotate about a third axis of rotation, which differs from the second axis of rotation, during a further segment of the movement.

6 Claims, 5 Drawing Sheets

WIND DEFLECTOR ARRANGEMENT

CROSS-REFERENCE TO RELATED APPLICATIONS

This application is a U.S. National Stage filing under 35 U.S.C. 371 of International Application No. PCT/EP2012/056676, filed Apr. 12, 2012, designating the United States and claims the benefit of foreign priority from German Patent Application Number 10 2011 103 980.9, filed Jun. 10, 2011, the entire disclosures of which are incorporated herein by reference.

The invention relates to a wind deflector arrangement for a roof opening, which can be closed and opened up by means of a cover, in a roof panel of a motor vehicle.

Wind deflector arrangements often have a large number of different mechanical components which take up a relatively large amount of space. The implementation of a wind deflector with an electric actuation means is generally expensive owing to the multiplicity of components required. Furthermore, during an actuation of the mechanism of the wind deflector arrangement for influencing the air flow, noises can occur in the region of the roof opening of the vehicle, for the damping of which yet further components may be required. Furthermore, energy losses may arise as a result of deflections on the mechanical components.

U.S. Pat. No. 7,878,582 B2 presents a drive for a wind deflector, in which a rotational movement of the drive is converted into a linear movement of the wind deflector.

DE 102 55 565 B3 describes a setting-out device for motor vehicle roofs, which setting-out device has three levers, which are pivotably connected to one another, for setting out a roof part.

It is desirable to specify a wind deflector arrangement which has both a small space requirement and also a large deployment angle. It is furthermore desirable to permit a simple, space-saving and low-cost design.

In one embodiment of the invention, a wind deflector arrangement for a roof opening, which can be closed and opened up by means of a cover, in a roof panel of a vehicle comprises a frame which is designed to at least partially surround the roof opening. The wind deflector arrangement furthermore comprises a wind deflector hoop which is coupled to the frame, such that the wind deflector hoop is rotatable relative to the frame and the roof panel about a first axis of rotation. The wind deflector arrangement furthermore comprises a support element which is coupled to the wind deflector hoop and to the frame such that the support element can rotate about a second axis of rotation during a first segment of the movement of the wind deflector hoop relative to the frame and can rotate about a third axis of rotation, which differs from the second axis of rotation, during a further segment of the movement.

The second axis of rotation is defined by a slotted guide which is arranged on the frame, and a projecting region of the support element, which 20 projecting region can be guided in the slotted guide. The slotted guide is open in one direction such that the projecting region can be coupled out of and into the slotted guide.

Since the support element rotates relative to the frame about two different axes of rotation during the movement of the wind deflector hoop, the wind deflector arrangement can be realized such that it takes up a small amount of space, and the wind deflector hoop encloses a large setting-out angle with the frame when folded out.

In a first position, in which the roof opening is closed, the wind deflector hoop is arranged substantially parallel to the frame and therefore to the roof panel. In embodiments, in the first position, the wind deflector hoop is inclined in the direction of the interior of the motor vehicle. In a second position, when the roof opening is opened up, the wind deflector hoop is rotated relative to the frame and thus relative to the roof panel about the first axis of rotation, such that the wind deflector hoop encloses a predefined angle with the frame. The apex of the angle lies on the axis of rotation. In the second position, the wind deflector hoop is inclined away from the interior of the motor vehicle.

The wind deflector hoop is movable between the first position and the second position. The first segment of the movement begins or ends at the first position. The second segment of the movement ends or begins at the second position of the wind deflector hoop.

During the first segment of the movement, in which the wind deflector hoop is substantially parallel to the frame and can be moved such that the angle between the frame and the wind deflector hoop increases up to a predefined value, the support element rotates about the second axis of rotation. A lever arm is thus generated, such that the wind deflector can be driven with a low force.

In embodiments, during the first segment of the movement, the support element rotates about the second axis of rotation, wherein the wind deflector hoop, starting in the first position in which it is inclined toward the interior of the motor vehicle, is moved such that the angle between the frame and the wind deflector hoop decreases to a predefined value until the wind deflector hoop is arranged substantially parallel to the frame and thus to the roof panel. A lever arm is thus generated, such that the wind deflector can be driven with a low force.

During the second segment of the movement, between the predefined value of the angle and the second position, the support element rotates about the third axis of rotation. Said third axis of rotation is arranged relative to the second and first axes of rotation such that a large value for the angle can be realized in the second position. Since the wind deflector already encloses at least the predefined value of the angle with the frame during the movement into the second position, an adequate lever arm is already realized.

The second axis of rotation is further remote, along the roof panel, than the third axis of rotation from the first axis of rotation. The second and third axes of rotation are at a smaller distance from one another than the first axis of rotation and the second axis of rotation. The second and third axes of rotation are at a smaller distance from one another than the first axis of rotation and the third axis of rotation. The second axis of rotation is in particular movable relative to the frame. The second axis of rotation is in particular movable transversely with respect to a main surface of extent of the roof panel. The third axis is movable relative to the frame. In particular, the third axis of rotation is movable along the frame along the main surface of extent of the roof panel.

According to further aspects, the first axis of rotation is defined by a rotary joint which couples the frame and the wind deflector hoop to one another. A simple, space-saving design is thus realized.

Since the second axis of rotation is defined by a slotted guide, which is arranged on the frame, and a corresponding projection of the support element, which projection is guided in the slotted guide 5 during the first segment of the movement, a simple, spacesaving design is realized.

According to further aspects, the third axis of rotation is defined by a rotary joint which couples the support element and the frame to one another. A simple, space-saving design is thus realized.

According to further aspects, the support element and the wind deflector hoop are coupled to one another by means of a rotary joint. A simple, space-saving design is thus realized.

According to further aspects, the wind deflector arrangement comprises a spring which is coupled to the frame and to the wind deflector hoop. The spring is designed to exert a spring force on the wind deflector hoop. In particular, the movement of the wind deflector hoop relative to the frame is driven by the force of the spring. Since the wind deflector hoop can rotate about the second axis of rotation in the first segment of the movement, a small spring force is sufficient to move the wind deflector hoop, because a good lever action is realized as a result of the arrangement of the second axis of rotation relative to the first and third axes of rotation. The spring is designed to exert a tensile force on the wind deflector hoop. A simple, space-saving design is thus realized.

BRIEF DESCRIPTION OF THE DRAWINGS

Further advantages, features and refinements will emerge from the following examples explained in conjunction with the figures. Identical elements, equivalent elements and elements of identical function may be denoted by the same reference numerals in the figures. The illustrated elements and their proportions relative to one another should basically not be regarded as being to scale; rather, individual elements, for example regions, may be illustrated with exaggeratedly large dimensions for better understanding.

In the drawings.

DETAILED DESCRIPTION OF EMBODIMENTS

Figure 1:
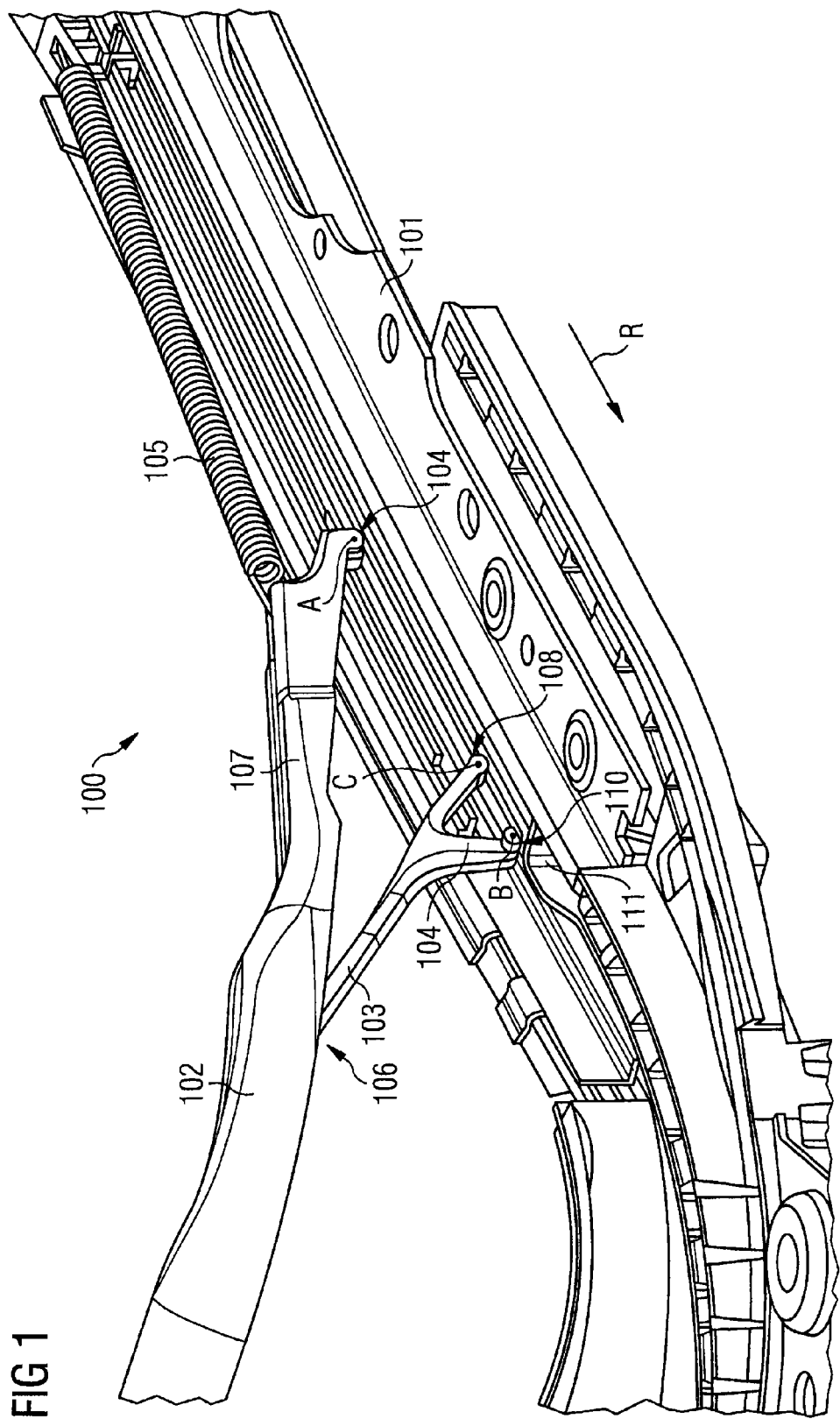
FIG. 1 shows a schematic illustration of a wind deflector arrangement according to one embodiment.

FIG. 1 shows a wind deflector arrangement 100. The wind deflector arrangement 100 is designed to influence the air flow in the region of a roof opening of a vehicle. The wind deflector arrangement comprises a frame 101. The wind deflector arrangement 100 furthermore comprises a wind deflector hoop 102 and a support element 103. The wind deflector arrangement can be coupled by means of the frame 101 to a roof panel of the motor vehicle. In the installed state, the frame 101 at least partially surrounds the roof opening. The roof opening can be closed and opened up by means of a cover, for example by means of a sliding roof of the motor vehicle. In the installed state, the frame is mounted on the roof opening in particular in the direction of the main direction of travel of the motor vehicle. In further embodiments, the frame 101 completely surrounds the roof opening.

The wind deflector hoop 102 is arranged in a front edge region of the roof opening with respect to a main direction of travel R of the vehicle. Said wind deflector hoop is mounted so as to be pivotable relative to the roof region between a lowered position and a set-out position.

The wind deflector hoop 102 has a wind deflector blade, which is aligned parallel to the front edge region of the frame, and two laterally arranged wind deflector flanks 107. The wind deflector flanks 107 are mounted so as to be pivotable about an axis of rotation A running in the transverse direction of the roof. In a lowered position, the wind deflector blade sinks below the sliding roof into a space delimited by the frame 101. In a fully set-out position (see FIG. 1), the wind deflector blade is arranged above the plane of the roof region or of the roof panel.

The wind deflector hoop 102 is U-shaped. The two flanks 107 of the wind deflector hoop are coupled in each case by means of a rotary joint 104 to the frame 101. The axis of rotation A runs through the two rotary joints 104.

The wind deflector hoop 102 is coupled to a spring 105. In particular, the wind deflector hoop 102 is coupled to one end of the spring 105 in a region of the flank 107 facing toward the rotary joint 104. The other end of the spring 105 is coupled to the frame 101.

The spring 105 is in particular a spiral spring and is set up and preloaded such that, in the operationally ready state, it exerts a tensile force on the wind deflector hoop 102. During an opening of the sliding roof, the wind deflector flanks 107 are released by the sliding roof, such that the wind deflector hoop 102 can be pivoted upward. The pivoting of the wind deflector hoop 102 is caused by the spring force of the spring 105.

The support element 103 is coupled to the wind deflector hoop 102 by means of a further rotary joint 106. The wind deflector arrangement has two support elements 103 which are arranged in each case on one of the flanks 107. The design and function of the two support elements 103 are similar, such that only one of the support elements 103 will be described. The design and mode of operation are transferable to the second support element.

The support element 103 is coupled to the frame 101 by means of a further rotary joint 108. The support element extends in elongate form between the two rotary joints 106 and 108. The support element 103 has a portion 109 which protrudes obliquely with respect to the elongate extent of the support element 103 between the rotary joints 106 and 108. On the region 109 there is arranged a further projecting region 110, for example a peg, which can be inserted into a slotted guide 111 of the frame 101.

When the projecting region 110 is guided in the slotted guide 111, an axis of rotation B is formed which is movable transversely with respect to the areal main extent of the roof panel. The slotted guide 111 is aligned perpendicular to the main direction of extent of the frame 101 and is open in the direction of the wind deflector hoop 102, such that the projecting region 110 can depart from the slotted guide 111 and couple into the slotted guide 111. The slotted guide 111 is aligned transversely with respect to the main direction of travel R.

The wind deflector hoop 102 is illustrated in FIG. 1 in a second position relative to the frame 101, in which the roof opening is opened up. The sliding roof is open. When the sliding roof is closed and the roof opening is closed, the wind deflector hoop moves around the rotary joints 104 in the direction of the frame 101. Here, the support element 103 rotates about the rotary joint 108 and an axis of rotation C which is defined by the rotary joints 108, until the angle between the wind deflector hoop 102 and the frame 101, the apex of which angle lies in the rotary joint 104, falls below a predefined value.

If the angle falls below the predefined value, the projecting region 110 of the support element 103 couples into the slotted guide 111. If the wind deflector hoop 102 moves further in the direction of the frame 101, the support element 102 rotates primarily about the axis of rotation B predefined by the projecting region 110 and the slotted guide 111. The rotation of the support element 103 relative to the frame 101 is determined by the projecting region 110 and the slotted guide 111. When the roof opening has been fully closed, the wind deflector hoop is arranged in a first position in which the wind deflector frame 102 and in particular the flanks 107 are arranged substantially parallel to the frame 101.

During the opening of the roof opening, the wind deflector hoop 102 is moved away from the frame 101 about the rotary joints 104 by the spring force of the spring 105. At the start of the movement, during a first segment of the movement, the projecting region 110 is guided in the slotted guide 111, such that an expedient lever arm is formed. As a result, a small spring force 105 is sufficient for rotating the wind deflector hoop 102 away from the frame 101 about the rotary joints 104. The axis of rotation C which is formed by the slotted guide 111 and the projecting region 110 for the support element 103 is arranged relative to the rotary joint 104 and the rotary joint 106 such that the force of the spring 105 on the wind deflector hoop 102 is intensified by the resulting lever action.

When the predefined value for the angle between the wind deflector hoop 102 and the frame 101 has been reached, the projecting region 110 departs from the slotted guide 111, such that the movement of the projecting region 110 is no longer restricted by the slotted guide 111. The movement of the support element 103 is subsequently determined, during a second segment of the movement, by the rotary joint 108 and the rotary joint 106. The rotary joint 108 is arranged relative to the rotary joint 104 and the rotary joint 106 such that, for given structural sizes, there is a large angle between the wind deflector hoop 102 and the frame 101 when the wind deflector hoop is arranged in the second position.

Since the movement of the support element 103 relative to the frame 101 and the wind deflector hoop 102 is determined by one of the two different axes of rotation B and C respectively at different times or in different segments of the movement of the wind deflector hoop 102 relative to the frame 101 and thus at different angles between the wind deflector hoop 102 and the frame 101, a large maximum arrangement of the wind deflector hoop 102 away from the frame 101 is possible, and also a relatively small installation space requirement is realized.

The movement of the support element 103 relative to the frame 101 is determined, in the first segment of the movement, by the movable axis of rotation B. At the transition to the second segment of the movement, the projecting region 110 couples out of the slotted guide 111 and the rotation is determined by the axis of rotation C, which is arranged at a different location on the support element 103 than the axis of rotation B. The axis of rotation B is displaceable transversely with respect to the direction R. The axis of rotation B is not displaceable along the direction R.

The axis of rotation C is not displaceable transversely with respect to the direction R. The axis of rotation C is displaceable along the direction R during the first segment of the movement. When the projecting region 110 departs from the slotted guide 111, the support element 103 impacts in the negative direction R against a stop of the frame 101, such that the axis of rotation C is displaced no further. During the second segment of the movement, the axis of rotation of the support element 103 is arranged at an end, which is coupled to the frame 101, of the support element 103.

In further embodiments, the wind deflector hoop 102 impacts in the negative direction R against a stop of the frame 101, such that the axis of rotation C is displaced no further, when the projecting region 110 departs from the slotted guide 111. During the second segment of the movement, the axis of rotation of the wind deflector hoop 102 is arranged at an end, which is coupled to the frame 101, of the flanks 107.

In the first segment of the movement, the wind deflector hoop 102 and the support element 103 tilt jointly relative to the frame 101 about the axis of rotation B, and at the same time the wind deflector hoop 102 is guided by the rotary joint 104 in the frame 101.

In the second segment of the movement, the wind deflector hoop 102 and the support element 103 tilt jointly relative to the frame 101 about the axis of rotation B, and at the same time the wind deflector hoop 102 is guided by the rotary joint 104 in the frame 101. In further embodiments, the wind deflector hoop 102 tilts relative to the frame 101 about the axis of rotation C.

The rotary joints 104 and 108 are in each case formed such that the associated axis of rotation A or B runs transversely with respect to the direction R. The slotted guide 111 and the projecting region 110 are formed such that the axis of rotation C runs transversely with respect to the direction R.

Figure 2:
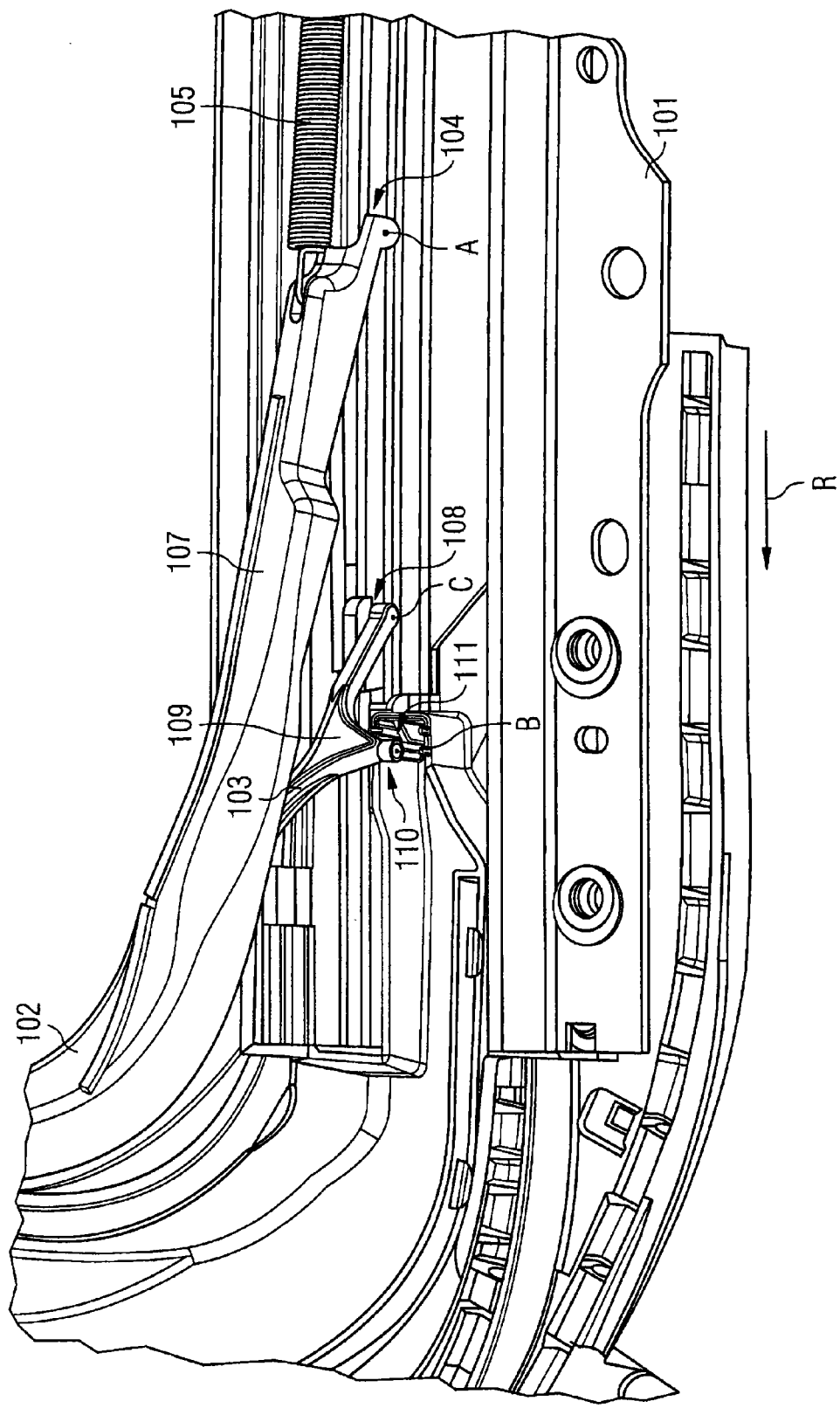
FIG. 2 shows a schematic illustration of the wind deflector arrangement of FIG. 1 from another viewing angle.

FIG. 2 shows a schematic illustration of the wind deflector arrangement 100 of FIG. 1 from another viewing angle. The rotary joint 108 is movable relative to the frame 101. In particular, the rotary joint 108 is movable along the main extent of the flanks 107 of the wind deflector hoop 102. Here, the rotary joint 108 is guided in the frame 101. The rotary joint 104 is likewise movable relative to the frame 101. The rotary joint 104 is movable along the main direction of extent of the flank 103, and in the process is guided in the frame 101. The slotted guide is arranged transversely with respect thereto, such that the axis of rotation composed of projecting regions 110 and slotted guide 111 is movable transversely with respect to the rotary joints 108 and 104.

Figure 3:
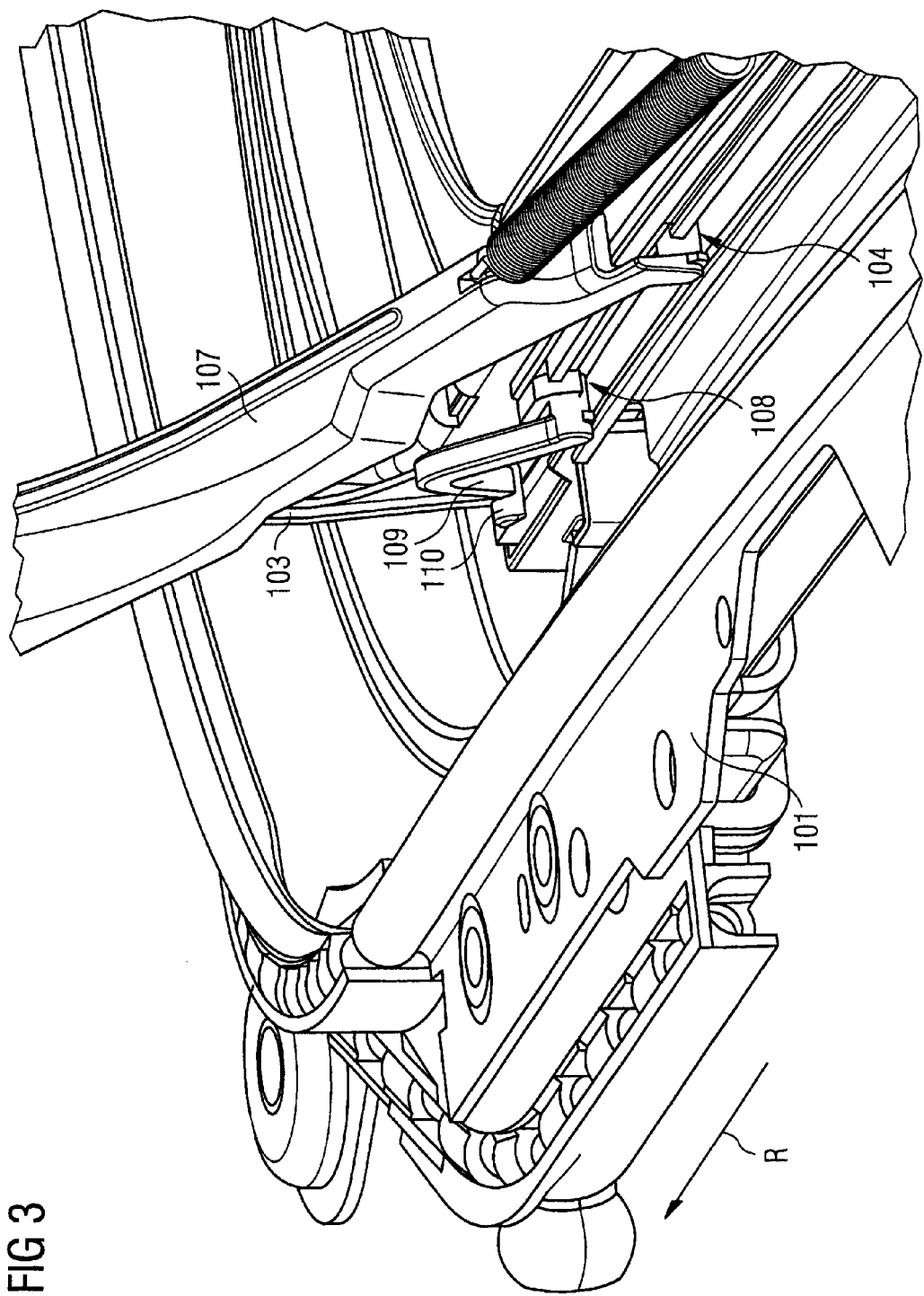
FIG. 3 shows a schematic illustration of the wind deflector arrangement from FIG. 1 from a further viewing angle.

FIG. 3 shows the wind deflector arrangement 100 from FIG. 1 from a further viewing angle approximately in the main direction of travel R of the vehicle when the wind deflector arrangement is in the mounted state. In the position of the support element 103 which is shown, the projecting region 110 is not guided in the slotted guide 111.

Figure 4:
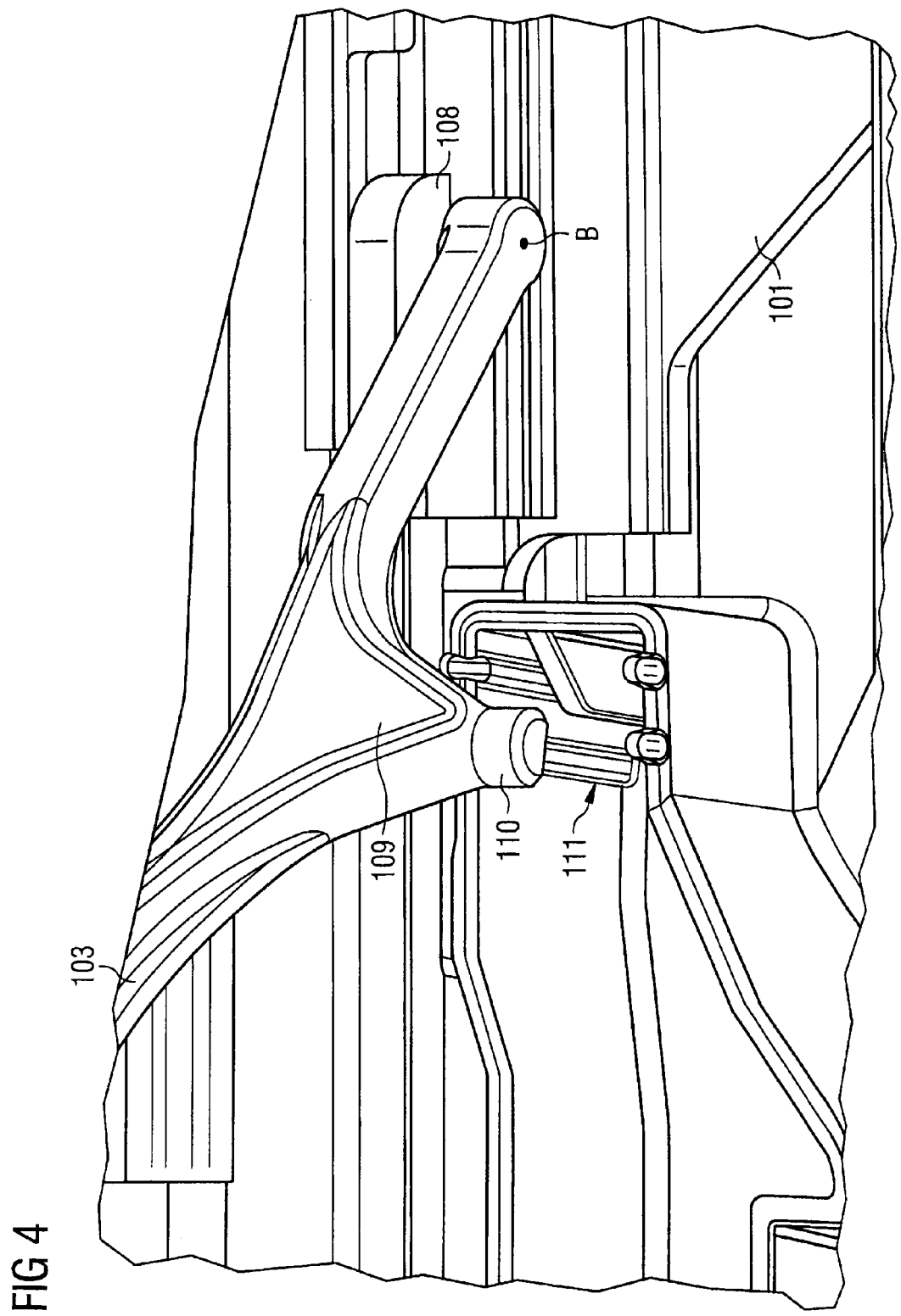
FIG. 4 shows a schematic detail illustration of the slotted guide.

FIG. 4 shows a schematic illustration of a detail of the wind deflector arrangement 100. The slotted guide 111 is formed from joints which the projecting region 110 can engage into and be guided by. The slotted guide 111 has slots or grooves in which the projecting region 110 is guided.

The slotted guide is open in the direction of the support element 103, such that the projecting region 110 couples into the slotted guide 111 from the direction of the support element 103 when the support element 103 moves in the direction of the frame 101. The slotted guide is designed such that the projecting region 110 is arranged below the rotary joint 108 when the wind deflector hoop is arranged in the first position.

The region 109 of the support element 103 protrudes beyond the rest of the support element 103 to such an extent that the region 110 which is arranged at the end of the region 109 is at a greater distance than the rotary joint 108 from the flank 107. The support element 103 is designed such that the axis of rotation B is arranged transversely with respect to the main surface of extent of the roof panel and below the axis of rotation A and the axis of rotation B when the wind deflector hoop 102 is arranged in the first position.

Figure 5:
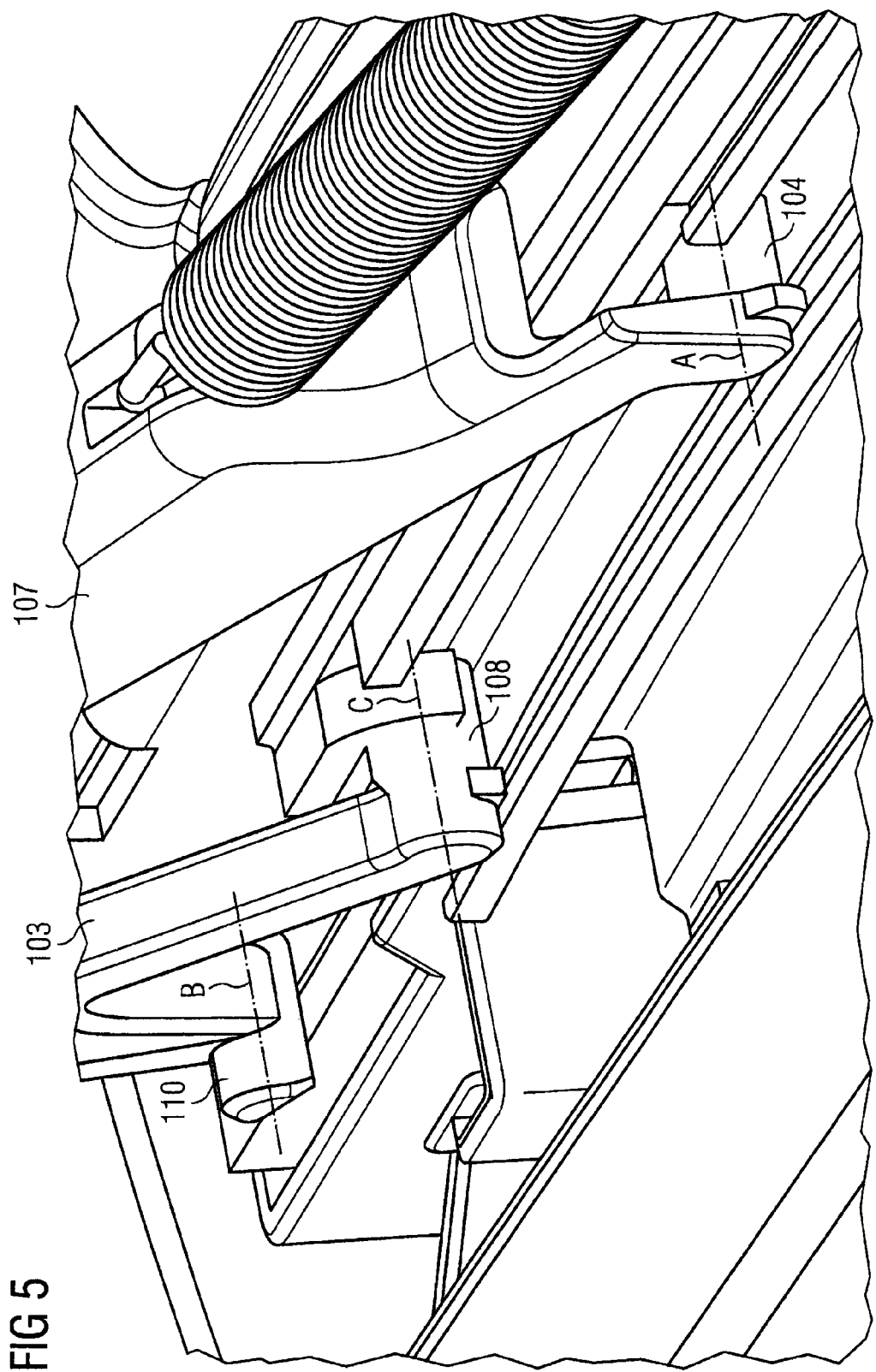
FIG. 5 shows a schematic illustration of the third axis of rotation.

FIG. 5 shows a schematic illustration of the rotary joint 108 of the wind deflector arrangement 100. In the position shown, the wind deflector hoop 102 is in the second position relative to the frame 101.

The support element 103 and the rotary joint 108 are displaced relative to the frame 101 in the direction of the rotary joint 104 and at a stop of the frame 101, which delimits the movement of the rotary joint 108 in the direction of the rotary joint 104. The rotary joint 104 is at a stop of the frame 101, which stop delimits the movement of the rotary joint 104 in the direction away from the rotary joint 108. In positions of the wind deflector hoop 102 in which the wind deflector hoop 102 is rotated closer to the frame 101, for example in the first position, the rotary joint 108 and the rotary joint 104 are in each case moved along the frame in the direction R (FIG. 1) and are at a distance from the respective stop of the frame 101.

The invention claimed is:

1. A wind deflector arrangement for a roof opening, which can be closed and opened up by means of a cover, in a roof panel of a vehicle, comprising:
   a frame which is designed to at least partially surround the roof opening,
   a wind deflector hoop which is coupled to the frame such that the wind deflector hoop is rotatable relative to the frame and the roof panel about a first axis of rotation,
   a support element which is coupled to the wind deflector hoop and to the frame such that the support element can rotate about a second axis of rotation during a first segment of the movement of the wind deflector hoop relative to the frame and can rotate about a third axis of rotation, which differs from the second axis of rotation, during a further segment of the movement, wherein the second axis of rotation is defined by a slotted guide, which is arranged on the frame, and a projecting region of the support element, which projecting region can be guided in the slotted guide, and in which the slotted guide is open in one direction, such that the projecting region can be coupled out of and into the slotted guide.

2. The wind deflector arrangement according to claim 1, in which the first axis of rotation is defined by at least one rotary joint which couples the wind deflector hoop and the frame.

3. The wind deflector arrangement according to claim 1, in which the second axis of rotation is displaceable relative to the frame transversely with respect to the areal main extent of the roof panel.

4. The wind deflector arrangement according to claim 1, in which the third axis of rotation is defined by at least one rotary joint.

5. The wind deflector arrangement according to 1, in which the support element is of elongate form and has a portion which protrudes obliquely with respect to the elongate extent of the support element.

6. The wind deflector arrangement according to claim 5, in which the projecting region is arranged on the portion.

* * * * *